(12) United States Patent
Mircea (10) Patent No.: US 9,982,789 B2
(45) Date of Patent: May 29, 2018

(54) SELF-RELIEVING BALL VALVE SEAT

(75) Inventor: Balan Mircea, Moore, OK (US)

(73) Assignee: Cameron International Corporation, Houston, TX (US)

( * ) Notice: Subject to any disclaimer, the term of this patent is extended or adjusted under 35 U.S.C. 154(b) by 136 days.

(21) Appl. No.: 12/632,340

(22) Filed: Dec. 7, 2009

(65) Prior Publication Data

US 2011/0133109 A1    Jun. 9, 2011

(51) Int. Cl.
*F16K 5/00* (2006.01)
*F16K 5/06* (2006.01)

(52) U.S. Cl.
CPC .................. *F16K 5/0673* (2013.01)

(58) Field of Classification Search
CPC ..... F16K 5/0668; F16K 5/0673; F16K 5/0678
USPC ....... 251/180–185, 192, 314, 316, 317, 363, 251/364, 365, 172, 315.01; 137/315.19–315.22
See application file for complete search history.

(56) References Cited

U.S. PATENT DOCUMENTS

| | | | | |
|---|---|---|---|---|
| 2,263,454 | A | * | 11/1941 | Clade .......................... 251/314 |
| 3,146,988 | A | | 9/1964 | Riopelle et al. |
| 3,211,421 | A | | 10/1965 | Johnson et al. |
| 3,226,080 | A | | 12/1965 | Lowrey |
| 3,269,692 | A | | 8/1966 | Shafer |
| 3,445,087 | A | * | 5/1969 | Davies et al. ................ 251/172 |
| 3,480,253 | A | | 11/1969 | Priese et al. |
| 3,497,176 | A | | 2/1970 | Priese |
| 3,497,178 | A | * | 2/1970 | Priese .......................... 251/174 |
| 3,521,855 | A | | 7/1970 | Jensen |
| 3,741,523 | A | | 6/1973 | Scaramucci et al. |
| 3,778,029 | A | * | 12/1973 | Baker ......................... 251/315.1 |
| 3,901,517 | A | * | 8/1975 | Heathcott ..................... 277/556 |
| 4,061,307 | A | | 12/1977 | Yoshiike et al. |
| 4,071,220 | A | | 1/1978 | Iino |

(Continued)

FOREIGN PATENT DOCUMENTS

DE    2312839 A1    9/1974
DE    19520900    12/1996

(Continued)

OTHER PUBLICATIONS

Singapore Written Opinion for Application No. 201203842-8 dated Oct. 24, 2012.

(Continued)

*Primary Examiner* — Matthew W Jellett
(74) *Attorney, Agent, or Firm* — Fletcher Yoder, P.C.

(57) ABSTRACT

A system, in certain embodiments, includes an annular ball valve seat including an annular spring, which biases the annular ball valve seat axially. More specifically, in certain embodiments, the annular ball valve seat includes a main body section, a lip section extending from the main body section, and a seat groove between the main body section and the lip section, wherein the first annular spring is disposed within the seat groove. A first leg of the annular spring biases the lip section in a first axial direction and a second leg of the annular spring biases the main body section in a second axial direction opposite the first axial direction. The annular ball valve seat is configured to be disposed within a ball valve, on either side of a ball of the ball valve. The particular design of the annular ball valve seat enables pressure within a body cavity of the ball valve to be self-relieving.

21 Claims, 7 Drawing Sheets

(56) References Cited

U.S. PATENT DOCUMENTS

| | | | |
|---|---|---|---|
| 4,111,393 A | | 9/1978 | McClurg et al. |
| 4,135,545 A | | 1/1979 | Fowler et al. |
| 4,157,170 A | * | 6/1979 | McClurg .................. 251/315.01 |
| 4,236,691 A | | 12/1980 | Wright |
| 4,258,901 A | * | 3/1981 | Zinnai et al. ................ 251/173 |
| 4,272,054 A | | 6/1981 | Zinnai |
| 4,304,392 A | | 12/1981 | Maciulaitis |
| 4,327,895 A | * | 5/1982 | Blumenkranz et al. . 251/315.14 |
| 4,386,756 A | | 6/1983 | Muchow |
| 4,428,561 A | | 1/1984 | Thompson |
| 4,477,055 A | | 10/1984 | Partridge |
| 4,483,511 A | | 11/1984 | Kushida et al. |
| 4,519,412 A | | 5/1985 | Grazioli |
| 4,552,335 A | | 11/1985 | Alexander et al. |
| 4,566,482 A | | 1/1986 | Stunkard |
| 4,606,368 A | * | 8/1986 | McCafferty ................ 137/15.22 |
| 4,658,847 A | * | 4/1987 | McCrone ....................... 137/72 |
| 4,706,970 A | * | 11/1987 | Ramirez ....................... 277/556 |
| 4,911,408 A | | 3/1990 | Kemp |
| 4,911,413 A | | 3/1990 | Baba et al. |
| 4,940,208 A | * | 7/1990 | Kemp ..................... 251/315.01 |
| 5,088,687 A | | 2/1992 | Stender |
| 5,137,259 A | * | 8/1992 | Stein ............................ 251/174 |
| 5,163,692 A | * | 11/1992 | Schofield et al. ............ 277/436 |
| 5,267,722 A | | 12/1993 | Coulter |
| 6,202,981 B1 | | 3/2001 | Davis et al. |
| 6,345,805 B1 | * | 2/2002 | Chatufale .................... 251/172 |
| 2004/0200988 A1 | | 10/2004 | Lorenz et al. |
| 2004/0256591 A1 | | 12/2004 | Latzer et al. |
| 2012/0167987 A1 | | 7/2012 | Balan et al. |
| 2012/0168660 A1 | | 7/2012 | Balan et al. |

FOREIGN PATENT DOCUMENTS

| | | |
|---|---|---|
| DE | 19712581 A1 | 10/1998 |
| DE | 10022909 | 11/2001 |
| EP | 0047147 | 3/1982 |
| EP | 0047147 A1 | 3/1982 |
| FR | 1261953 A | 5/1961 |
| GB | 2105010 A | 3/1983 |
| GB | 2140534 A | 11/1984 |
| JP | 2007/232019 A | 9/2007 |

OTHER PUBLICATIONS

International Search Report and Written Opinion dated Mar. 6, 2012 in PCT Application No. PCT/US11/065667.
International Search Report and Written Opinion dated Mar. 6, 2012 in PCT Application No. PCT/US11/065663.

* cited by examiner

SELF-RELIEVING BALL VALVE SEAT

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves may be employed to open or close to enable or block a flow of fluid in a variety of applications. Ball valves typically include a body, an adapter, a rotatable ball disposed within the body and adapter, and a stem coupled to the ball. However, when the ball rotates within the ball valve to block the flow of fluid, the fluid under pressure may often become trapped in a body cavity of the ball valve. The trapped fluid may increase the pressure under temperature variations, increasing the torque required to actuate the ball or, if not vented, the pressure may adversely affect surrounding parts, resulting in leakage or release of the fluid to the atmosphere.

SUMMARY OF THE INVENTION

The disclosed embodiments include "floating" ball valve seats, which may be configured to move (or float) between a ball and body of the ball valve or between a ball and adapter of the ball valve. This slight movement, generated by different pressures between a body cavity and a body bore of the ball valve may enable the ball valve seats to release pressure trapped within the body cavity of the ball valve. In particular, in certain embodiments, the ball valve seats may be annular seats, each having a main body section, a lip section extending from the main body section, and a seat groove between the main body section and the lip section. Annular springs, such as v-shaped or u-shaped metallic cantilever springs, may be inserted into the seat grooves, such that the annular springs bias the main body sections and the lip sections of the ball valve seats in opposite axial directions, the seal with the ball having a smaller diameter than the seal with the body (or adapter). Due at least in part to the different sealing diameters, the pressure may develop a force that pushes the ball valve seat against the body when the cavity pressure is higher than the line pressure. As such, the cavity pressure is allowed to be released close to the line pressure on the upstream side of the valve, enabling a self-relieving effect of the ball valve seat. In addition, the annular springs may be more capable of retaining their elasticity over time than the elastic main body sections of the ball valve seats. Therefore, utilizing the tendency of the annular springs to bias the main body sections and lip sections of the ball valve seats in axial directions may improve the overall life cycle of the ball valve seats.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
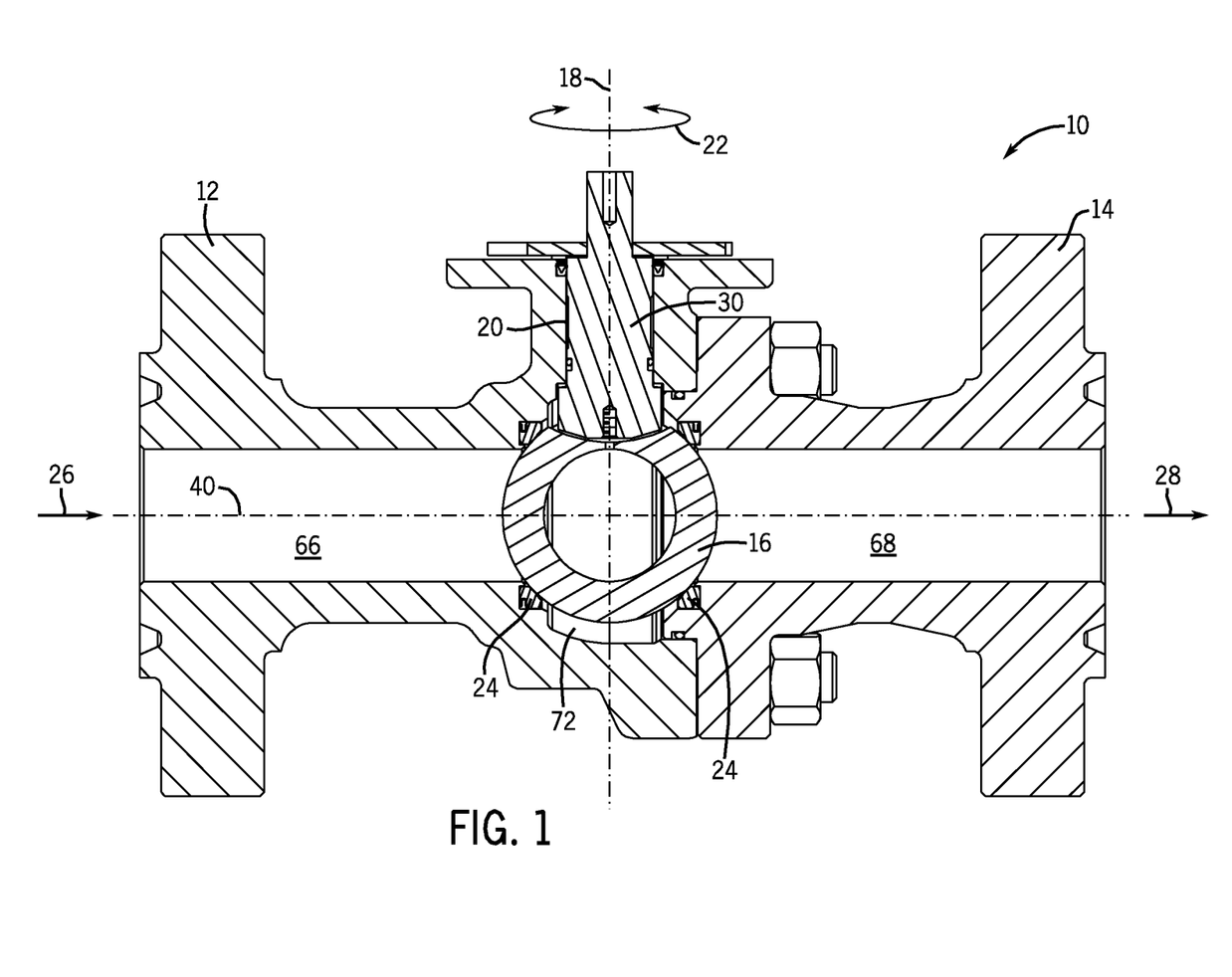
FIG. 1 is a cross sectional view of an exemplary ball valve in accordance with an embodiment of the present invention.

Turning now to the figures, an exemplary ball valve 10 is illustrated in FIG. 1. In the presently illustrated embodiment, the ball valve 10 includes an annular body 12 and an annular adapter 14. The body 12 and the adapter 14 of the ball valve 10 are configured to mate with each other. As illustrated, a ball 16 may fit between the body 12 and the adapter 14 of the ball valve 10. The ball 16 may be configured to rotate about an axis 18 through an opening 20 in the body 12, as illustrated by arrow 22. Rotation of the ball 16 may enable or block the flow of a fluid through the body 12 and the adapter 14 of the ball valve 10. As illustrated, a pair of seats 24 is disposed on opposite sides of the ball 16 to provide seals between the ball 16 and bores (e.g., like circular passages) within the body 12 and the adapter 14.

In general, a fluid may enter through either the body 12 or the adapter 14 and exit through the other. For example, in the illustrated embodiment, fluid may enter through the body 12, as illustrated by arrow 26, and may exit through the adapter 14, as illustrated by arrow 28. However, in other embodiments, fluid may enter through the adapter 14 and exit through the body 12. In either case, as described in greater detail below, the ball 16 between the seat 24 installed in the body 12 and the seat 24 installed in the adapter 14 may control the open and closed positions of the ball valve 10, enabling or blocking the flow of the fluid through the ball valve 10. More specifically, in certain embodiments, a valve stem 30 may be inserted within the opening 20 through the top of the body 12 and may control rotation of the ball 16 between the body 12 and the adapter 14, thereby moving the ball valve 10 between a closed position and an open position.

Conventional ball valves require seats to be installed between the body or the adapter and the ball, with the seats being designed such that when the ball valve is assembled, both seats are compressed and the seat bodies are substantially deformed. More specifically, a radial-axial elastic-plastic deformation of the seats is used to create a seal between the ball and the body and/or the adapter. As described in greater detail below, the disclosed embodiments may provide for a body seat 24 to be installed between the body 12 and the ball 16 and an adapter seat 24 to be installed between the ball 16 and the adapter 14, such that minimal radial-axial compression between the ball 16 and the seats 24 is required. In particular, instead of requiring that the seats 24 be pre-loaded by radial-axial compression between the ball 16 and the respective body 12 or seat 14, the particular design of the seats 24 may only use axial compression of respective lip sections of the seats 24 to ensure adequate sealing between the ball 16 and bores within the body 12 and the adapter 14.

Figure 2A:
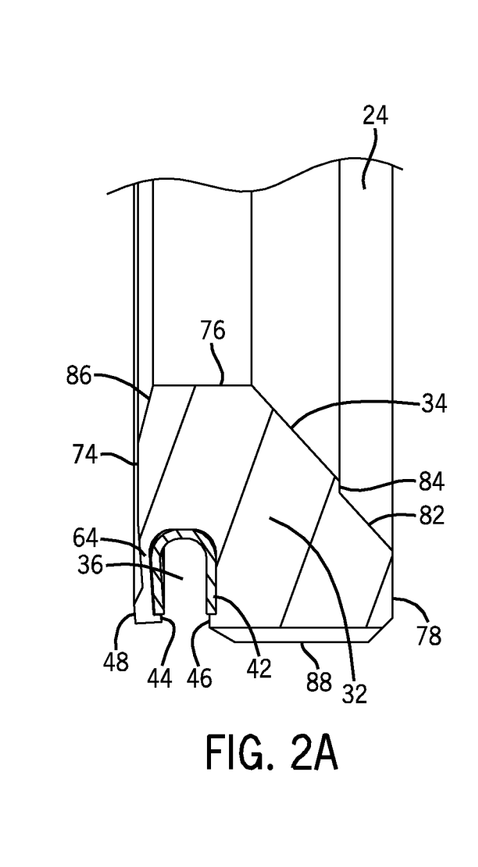
FIG. 2A is a cross sectional view of an exemplary ball valve seat and spring assembled together.
Figure 2B:
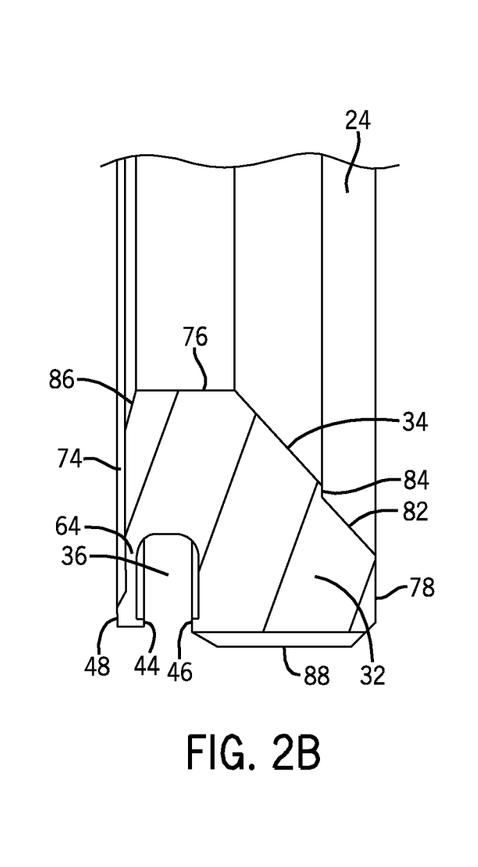
FIG. 2B is a cross sectional view of the exemplary ball valve seat of FIG. 2A.
Figure 2C:
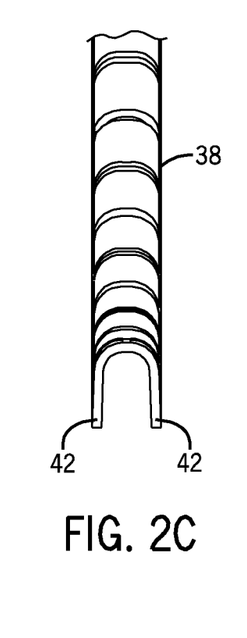
FIG. 2C is a cross sectional view of the exemplary spring of FIG. 2A.
Figure 2D:
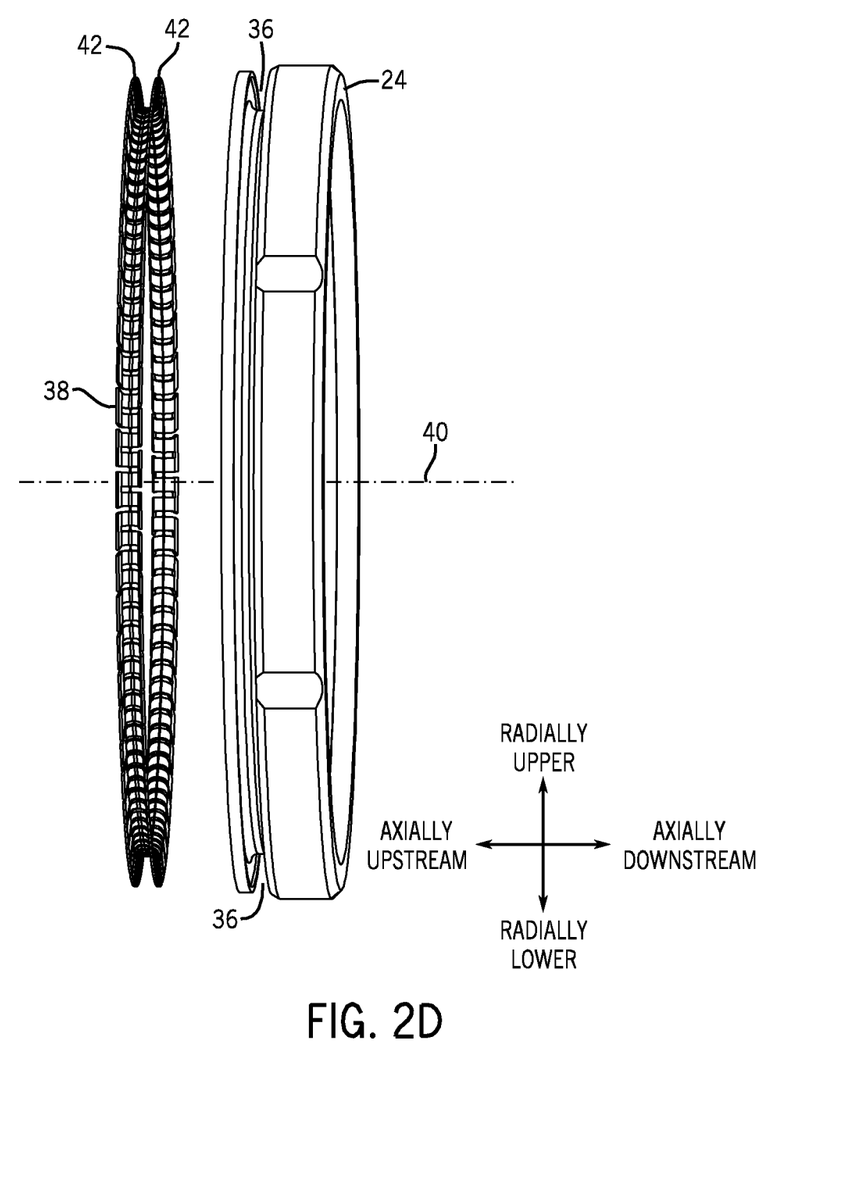
FIG. 2D is a perspective view of the exemplary ball valve seat and spring of FIGS. 2A through 2C before installation in the ball valve of FIG. 1.

In general, in certain embodiments, the body seat 24 and the adapter seat 24 may be similarly designed and may be used interchangeably. FIGS. 2A and 2B are cross sectional views of an exemplary seat 24, with its components in an un-deformed condition (e.g., a condition of the seat 24 prior to assembly in the ball valve 10). The main body section 32 of the seat 24 has a tapered or shaped surface 34 that comes into contact with a ball surface. On the other side of the main body section 32 of the seat 24 is a groove 36. The annular-shaped seat 24 may be associated with an annular-shaped spring 38 which, when assembled, may fit within the annular groove 36 of the seat 24. More specifically, FIG. 2C is a cross sectional view of an exemplary spring 38, which in certain embodiments may be a v-shaped or u-shaped cantilever spring (e.g., a spring cantilevered at a first end and configured to support or resist a force at a second end) configured to bias in an axial direction relative to the spring 38 along a central axis 40 of the ball valve 10. However, any type of spring 38 capable of resisting compression in an axial direction may be used with the body seat 24. In particular, legs 42 of the illustrated cantilever spring 38 may resist compression in an axial direction. After the spring 38 is installed into the groove 36 of the body seat 24, the spring 38 is held in place by the legs 42, which come into contact with first and second protrusions 44 and 46 of the seat 24 in such a way that the spring 38 is not able to come out of the groove 36. As described in greater detail below, the nature of the spring 38 to resist axial compression may enable the seat 24 to provide a seal between a lip section 48 of the seat 24, which comes into contact with the body 12 or the adapter 14, and the surface 34, which comes into contact with the ball 16 of FIG. 1. FIG. 2D is a perspective view of the spring 38 and the seat 24 before installation in the ball valve 10.

Figure 3:
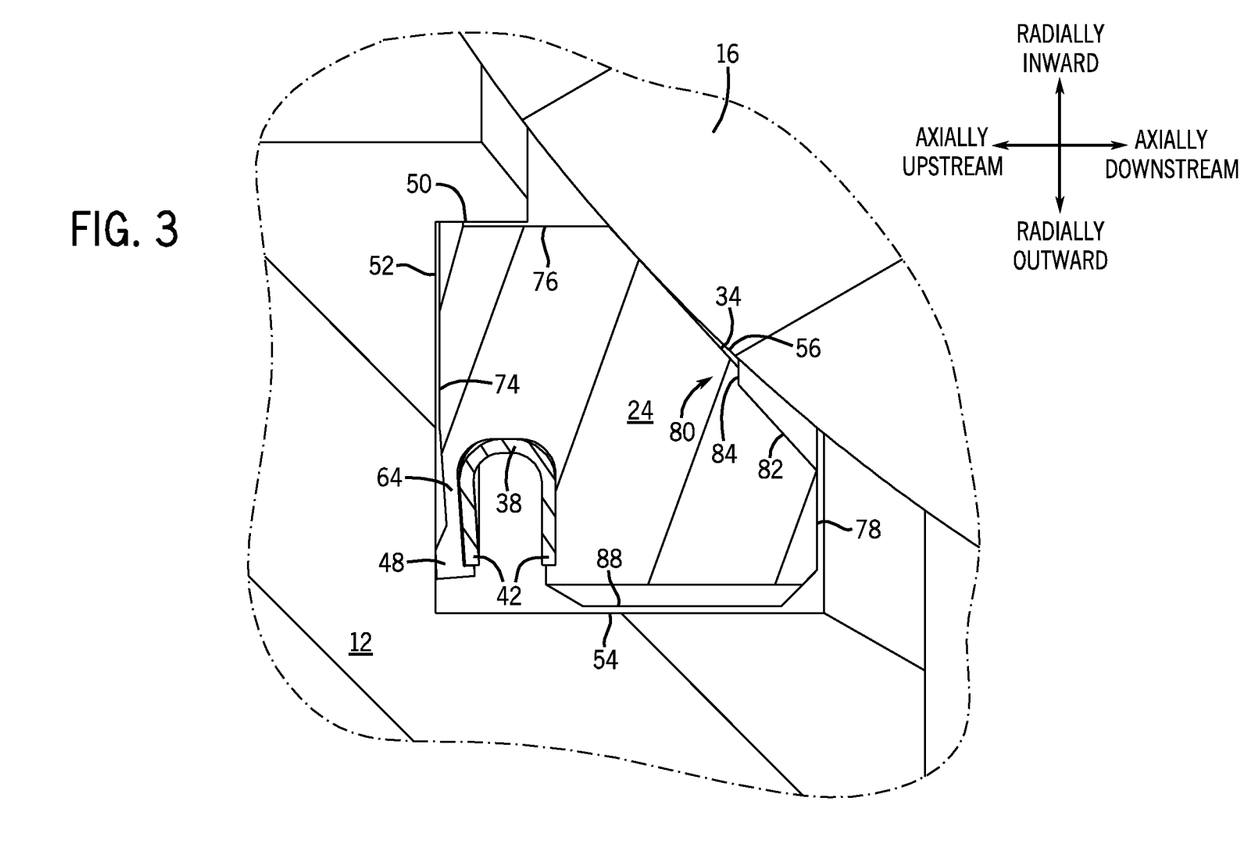
FIG. 3 is a cross sectional view of the exemplary ball valve seat and spring of FIGS. 2A through 2D installed in the ball valve of FIG. 1.

FIG. 3 is a cross sectional view of the seat 24 after being installed in the ball valve 10, illustrating the position between the body 12 or the adapter 14 and the ball 16. In the illustrated embodiment, the body seat 24 is installed between the body 12 and the ball 16. When installed in the ball valve 10, the body seat 24 fits into an annular groove created by the surfaces 50, 52, 54 of the body 12, and the surface 34 of the body seat 24 contacts the ball 16 on surface 56. Similarly, the adapter seat 24 installed into the adapter 14 fits into an annular groove created by the surfaces 58, 60, and 62 of the adapter 14, and the surface 34 of the adapter seat 24 contacts the ball 16 on surface 56. When the adapter 14 is assembled with the body 12, the lip sections 48 of the body seat 24 and the adapter seat 24 come into contact with body surface 52 and adapter surface 60, respectively. The lip section 48 causes deformation of the lip leg 64 and compression on the legs 42 of the spring 38. The spring compression during valve assembly keeps the seats 24 in contact with the body 12, adapter 14, and ball 16, and energizes the seals when the pressure is applied.

Figure 4:
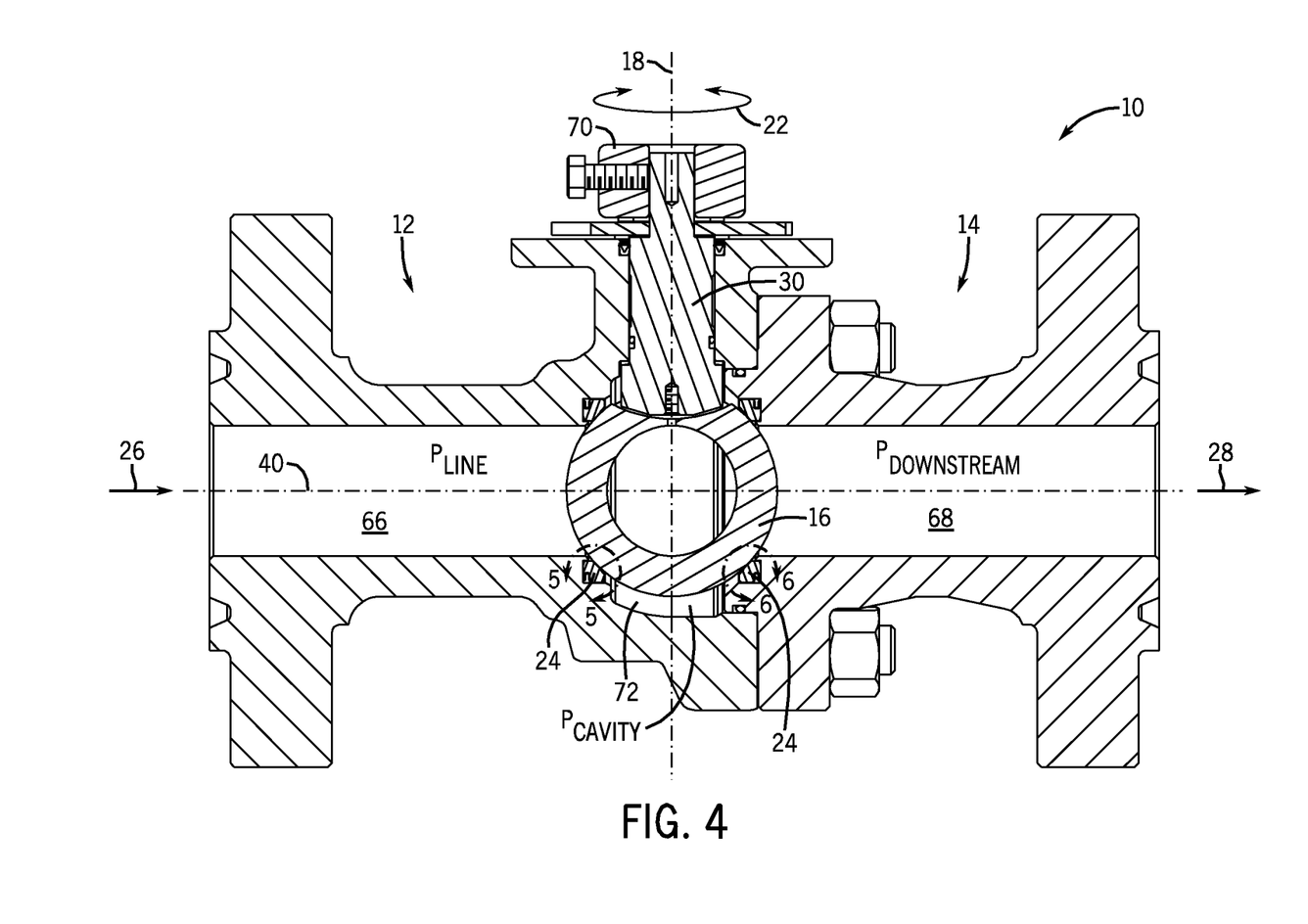
FIG. 4 is a cross sectional view of the ball valve of FIG. 1, after the ball valve has been closed and pressure has been applied.

FIG. 4 is a cross sectional view of the ball valve 10 of FIG. 1 having pressure applied on the body 12 side of the ball valve 10. The body 12 and the adapter 14 may be coupled together using various methods. The ball 16 may fit between the body 12 and the adapter 14, wherein the ball 16 may enable or block the flow of a fluid through a body bore 66 (e.g., cylindrical passage) within the body 12 and an adapter bore 68 (e.g., cylindrical passage) within the adapter 14. In the illustrated embodiment, the fluid enters through the body bore 66 and exits through the adapter bore 68. In other words, in the illustrated embodiment, the body bore 66 is the upstream bore and the adapter bore 68 is the downstream bore. However, in other embodiments, the flow may be reversed such that the fluid enters through the adapter bore 68 and exits through the body bore 66. In these embodiments, the adapter bore 68 would be the upstream bore and the body bore 66 would be the downstream bore.

As described above, the ball valve 10 may include a valve stem 30 extending radially through the top of the body 12 along the radial axis 18 (e.g., perpendicular to the central axis 40). The valve stem 30 may be rotated about the radial axis 18 by a valve actuator 70, as illustrated by arrow 22. Rotation of the valve stem 30 about the radial axis 18 may cause the ball 16 to also rotate about the radial axis 18. As the ball 16 rotates about the radial axis 18, the ball 16 may move between an open position and a closed position. When the ball 16 is in the open position, the fluid may be allowed to flow from the body bore 66 to the adapter bore 68, or vice versa, relatively unimpeded. Conversely, when the ball 16 is in the closed position, the fluid may be blocked from flowing from the body bore 66 to the adapter bore 68, or vice versa. In both the open or closed positions, the seats 24 may provide a seal, generally blocking the flow of fluid into or out of a body cavity 72 between the ball 16 and the body 12 and adapter 14.

In operation, the seats 24 energize and re-energize the seal between both the ball 16 and the body bore 66 and the ball 16 and the adapter bore 68 every time the ball valve 10 is operated, de-pressurized, and the pressure is applied again. The method for energizing the seal and ensuring that the seats 24 stay in contact with the ball 16 during valve operations and pressure fluctuations is to push against the main body sections 32 of the seats 24 during assembly of the ball valve 10 by compressing the ball 16 against the main body sections 32 of the seats 24, thereby deforming the lip legs 64 of the seats 24 and compressing the springs 38. Using this method, the amount of deformation of the main body sections 32 of the seats 24 depends on the testing pressure, the size of the ball valve 10 (e.g., the size of the ball 16, the body 12, the adapter 14, the seats 24, and so forth), the material properties of the seats 24, and so forth. However, this deformation is not significant, with the deformation taking place in the lip section 48, the lip leg 64, and the annular spring 38 in an axial direction every time the ball valve 10 is operated and/or the ball valve 10 experiences pressure fluctuations. The lip leg 64 will deform such that the seat surface 74 contacts the body surface 52 (or the adapter surface 60) when the ball load is applied to the seat 24.

In certain embodiments, the seats 24 may be made from plastic materials, or a combination of plastic and metallic materials, with the lip section 48 and lip leg 64 made from a plastic material. As a result of the deformation of the lip section 48 of the seat 24, the lip leg 64 of the seat 24, and the spring 38 during assembly, a contact stress may be created between the ball 16 and the surface 34 of the seat 24. The contact stress between the ball 16 and the seat 24 may affect the operational effectiveness of the ball valve 10 by, for example, controlling the amount of pressure trapped in the body cavity 72 when the ball valve 10 is closed and the fluid within the body bore 66 and the adapter bore 68 is de-pressurized. Moreover, the amount of pressure trapped in the body cavity 72 generally depends on the initial pre-load between the ball 16 and the seats 24 during assembly of the ball valve 10. The pressure of the fluid trapped in the body cavity 72 generally causes the torque required to actuate the ball 16 to be higher on the low-pressure side, thereby reducing the effectiveness of the ball valve 10. Therefore, it is beneficial to have the pressure of the fluid trapped in the body cavity 72 to be as low as possible. The embodiments disclosed herein enable the pressure of the fluid trapped in the body cavity 72 to be self-relieving, as described in greater detail below, thereby reducing the negative effects on the torque of the ball valve 10.

More specifically, the disclosed embodiments enable the ball valve 10 to be assembled with minimal compression between the ball 16 and the seats 24. In particular, the seats 24 described herein may function as "floating seats." In other words, the seats 24 may be configured such that the ball 16 may move (or float) axially in either an upstream direction (e.g., toward the body bore 66) or a downstream direction (e.g., toward the adapter bore 68). As such, the pressure trapped in the body cavity 72 may be automatically adjusted based on the upstream and downstream pressures of the fluid in the body bore 66 and the adapter bore 68, respectively. For example, if the ball 16 moves axially toward the adapter bore 68, the pressure trapped in the body cavity 72 may be released toward the body bore 66 between surfaces of the body seat 24 and the ball 16. Conversely, if the ball 16 moves axially toward the body bore 66, the pressure trapped in the body cavity 72 may be released toward the adapter bore 68 between surfaces of the adapter seat 24 and the ball 16.

However, despite allowing a certain degree of axial freedom to the ball 16, the seats 24 may nevertheless still provide adequate sealing between the ball 16 and the body bore 66 and the ball 16 and the adapter bore 68. This is at least partially due to the fact that the main body sections 32 of the seats 24 are allowed to move slightly, while still maintaining a seal between abutting surfaces of the body 12 or the adapter 14. In particular, as described above, springs 38 may exert axial forces within the main body sections 32 of the seats 24, which cause lip sections 48 of the seats 24 to push against abutting surfaces of the body 12 or adapter 14.

Figure 5:
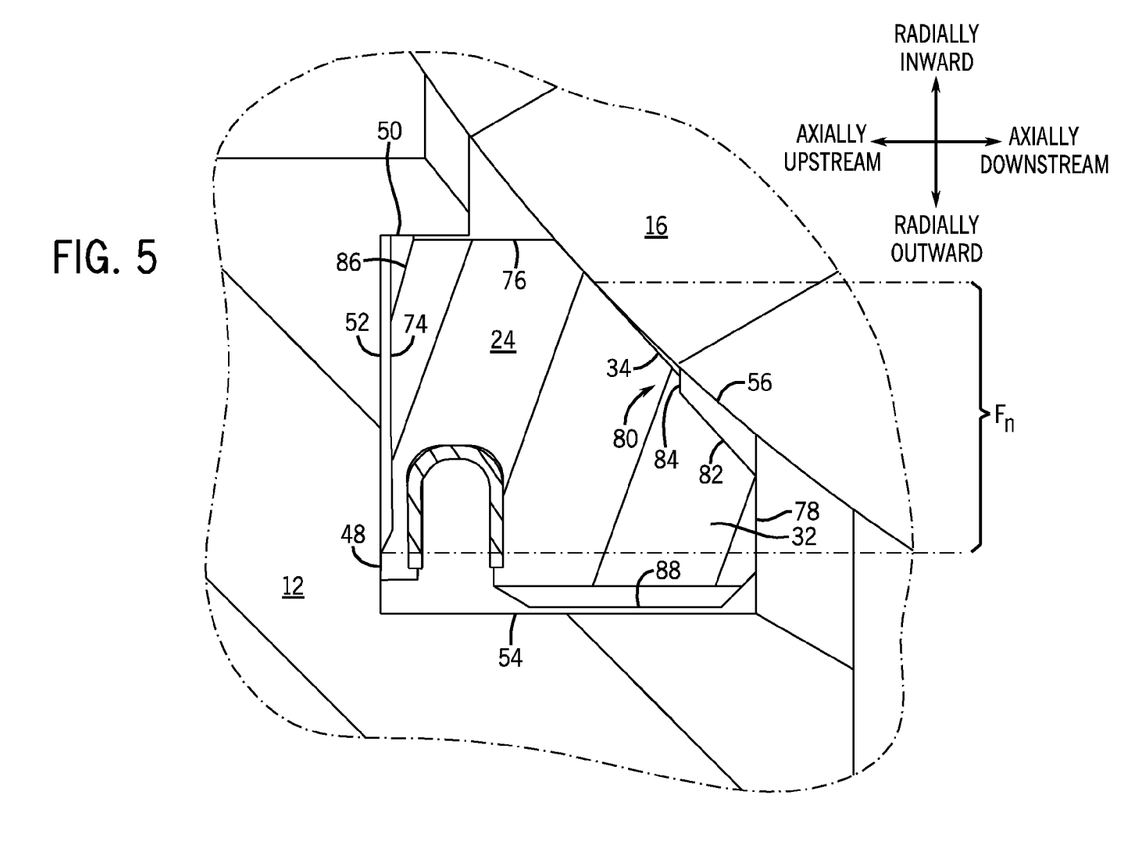
FIG. 5 is a cross sectional view of an exemplary ball valve seat on a body side (e.g., upstream side) of a ball of the ball valve, after the ball valve has been closed and pressure has been applied, as taken within arcuate line 5-5 of FIG. 4.
Figure 6:
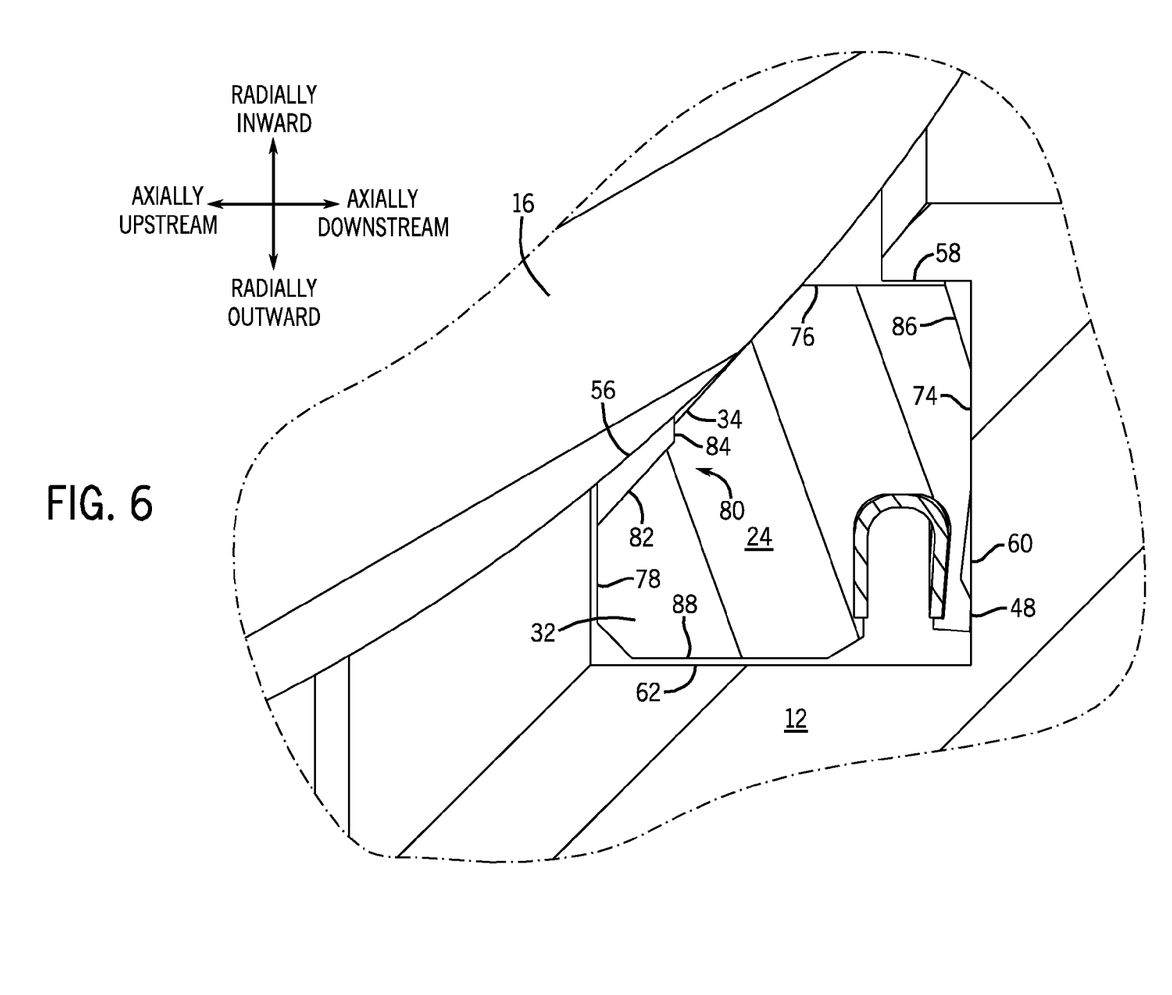
FIG. 6 is a cross sectional view of an exemplary ball valve seat on an adapter side (e.g., downstream side) of a ball of the ball valve, after the ball valve has been closed and pressure has been applied, as taken within arcuate line 6-6 of FIG. 4.

FIGS. 5 and 6 are intended to illustrate features of an exemplary seat 24 and spring 38. For example, FIG. 5 is a cross sectional view of the seat 24 on the body 12 side of the ball 16 of the ball valve 10, as taken within arcuate line 5-5 of FIG. 4, wherein the ball valve 10 has been closed and pressurized. FIG. 6 is a cross sectional view of the seat 24 on the adapter 14 side of the ball 16 of the ball valve 10, as taken within arcuate line 6-6 of FIG. 4, wherein the ball valve 10 has been closed and pressurized.

As illustrated in FIGS. 5 and 6, main body sections 32 of the seats 24 may generally be shaped as rectangular sections with carved out sections (e.g., facing the ball 16) extending from approximate midpoints of radially inward surfaces 76 of the seats 24 to approximate midpoints of first axial surfaces 78 of the seats 24 (e.g., an axially downstream surface 78 of the body seat 24 of FIG. 5 and an axial upstream surface 78 of the adapter seat 24 of FIG. 6). Although illustrated as extending from approximate midpoints of the radially inward surfaces 76 and the first axial surfaces 78 of the seats 24, in certain embodiments, the carved out sections of the seats 24 may extend from any point along the radially inward surfaces 76 and the first axial surfaces 78.

Angled surfaces 80 extending from the radially inward surfaces 76 of the seats 24 to the first axial surfaces 78 may be referred to as ball-interfacing surfaces 80. As illustrated in FIGS. 5 and 6, in certain embodiments, the ball-interfacing surfaces 80 may actually include first and second surfaces 34, 82 connected by a tapered section 84. As such, only part of the ball-interfacing surfaces 80 may actually make contact with the ball 16. More specifically, only the first ball-interfacing surface 34 may make contact with the ball 16. In certain embodiments, the first ball-interfacing surface 34 may be a tapered surface, a curved surface (e.g., a concave surface), or a surface otherwise tailored to the geometry of the ball 16. The first ball-interfacing surfaces 34 have smaller dimensions as compared with the lip sections 48. Reducing the contact surfaces between the ball-interfacing surfaces 80 and the ball 16 may increase the contact pressure between the seats 24 and the ball 16, thereby creating a more effective seal.

In addition, the seats 24 may include substantially smaller carved out sections 86 (e.g., beveled edges) extending from the radially inward surfaces 76 to second axial surfaces 74 of the seats 24, respectively. These carved out sections 86 may define the size of the surface 74 that comes into contact with body surface 52 or adapter surface 60 to ensure full ball support when the seat 24 is an upstream seat, and to make surface 74 as a second sealing surface (the first sealing surface being the lip section 48) when the seat 24 is a downstream seat.

In addition, as described above, the seats 24 may include grooves 36, within which the springs 38 may be inserted prior to or during assembly of the ball valve 10. As illustrated in FIG. 2A, each spring 38 may be held in place within its respective groove 36 by a first protrusion 44 extending from the lip section 48 of the seat 24 toward the radially outward surface 88 of the seat 24 and by a second protrusion 46 extending from the radially outward surface 88 of the seat 24 toward the lip section 48 of the seat 24.

As illustrated by FIG. 5, the body seat 24 may be held in place within a carved out rectangular groove of the body 12. More specifically, as illustrated, the body seat 24 may be held in place within a radially inward surface 50, an axially upstream surface 52, and a radially outward surface 54 of the body 12. In general, the radially inward surface 50 of the body 12 and the radially outward surface 54 of the body 12 are open-ended with ends that are proximate to the ball 16 when the ball valve 10 is assembled. During assembly of the ball valve 10, the body seat 24 may be inserted into the carved out rectangular groove defined by the radially inward surface 50, axially upstream surface 52, and radially outward surface 54 of the body 12. As such, the body seat 24 may generally be held in place within the carved out rectangular groove of the body 12 by the radially inward surface 76 and the radially outward surface 88 of the body seat 24, which abut the radially inward surface 50 and the radially outward surface 54 of the body 12, respectively.

Similarly, as illustrated by FIG. 6, the adapter seat 24 may be held in place within a carved out rectangular groove of the adapter 14. More specifically, as illustrated, the adapter seat 24 may be held in place within a radially inward surface 58, an axially downstream surface 60, and a radially outward surface 62 of the adapter 14. In general, the radially inward surface 58 of the adapter 14 and the radially outward surface 62 of the adapter 14 are open-ended with ends that are proximate to the ball 16 when the ball valve 10 is assembled. During assembly of the ball valve 10, the adapter seat 24 may be inserted into the carved out rectangular groove defined by the radially inward surface 58, axially downstream surface 60, and radially outward surface 62 of the adapter 14. As such, the adapter seat 24 may generally be held in place within the carved out rectangular groove of the adapter 14 by the radially inward surface 76 and the radially outward surface 88 of the adapter seat 24, which abut the radially inward surface 58 and the radially outward surface 62 of the adapter 14, respectively.

The springs 38 may energize the seal between the ball 16 and the body 12 and the ball 16 and the adapter 14 during operation of the ball valve 10. More specifically, as described above, the springs 38 may be v-shaped or u-shaped cantilever springs configured to bias in an axial direction along the central axis 40 of the ball valve 10. Upon installation, the legs 42 of the springs 38 push against the main body sections 32 of the seats 24 and the lip legs 64 of the seats 24, biasing the lip sections 48 and lip legs 64 away from the main body sections 32 of the seats 24. This tends to bias the lip section 48 and the lip leg 64 of the body seat 24 toward the axially upstream surface 52 of the body 12 and the surface 34 of the body seat 24 toward the surface 56 of the ball 16. Similarly, this tends to bias the lip section 48 and the lip leg 64 of the adapter seat 24 toward the axially downstream surface 60 of the adapter 14 and the surface 34 of the adapter seat 24 toward the surface 56 of the ball 16.

Returning now to FIG. 4, when the fluid flows through the ball valve 10 and is pressurized at a line pressure $P_{line}$ with the ball 16 in an open position, and the ball 16 is subsequently rotated into a closed position, the pressure in the body cavity 72 ($P_{cavity}$) may be approximately the same as the line pressure $P_{line}$. If the downstream pressure $P_{downstream}$ in the adapter bore 68 is released, then the ball 16 will push against the adapter seat 24 since the line pressure $P_{line}$ in the body bore 66 will be greater than the downstream pressure $P_{downstream}$ in the adapter bore 68. As illustrated in FIG. 6, the adapter seat 24 supports the ball 16 by the first ball-interfacing surface 34. In addition, as illustrated, the lip section 48 and the lip leg 64 of the adapter seat 24 may deform such that the second axial surface 74 of the adapter seat 24 contacts the axially downstream surface 60 of the adapter 14. As such, when this happens, the adapter seat 24 may support the entire load of the ball 16. At the same time, as illustrated in FIG. 5, the spring 38 within the body seat 24 may relax such that the axial surface 74 of the body seat 24 moves away from the axially upstream surface 52 of the body 12 and only the lip section 48 of the body seat 24 remains in contact with the axially upstream surface 52 of the body 12. The body seat 24 moves with the ball 16 such that the seat surface 34 remains in contact with the surface 56 of the ball 16.

If the line pressure $P_{line}$ on the upstream side of the ball 16 decreases, the body cavity pressure $P_{cavity}$ may be greater than the line pressure $P_{line}$ in the body bore 66. As a result, since the axially upstream surface 52 of the body 12 contacts with the lip section 48, which has a greater diameter than the surface 34 which contacts the ball 16, a force $F_n$ will be created from the body cavity 72 which pushes the body seat 24 away from the ball 16 axially (e.g., the second axial surface 74 and the lip section 48 of the body seat 24 approach the axially upstream surface 52 of the body 12), temporarily moving the ball surface 56 away from the seat surface 34, allowing the body cavity pressure $P_{cavity}$ to decrease to a pressure close to the line pressure $P_{line}$ in the body bore 66. This illustrates the self-relieving effect of the seats 24 described herein.

Conversely, if the line pressure $P_{line}$ on the upstream side of the ball 16 increases, the line pressure $P_{line}$ will cause the lip section 48 of the body seat 24 to move away from the axially upstream surface 52 of the body 12, allowing the body cavity pressure $P_{cavity}$ to increase to a pressure close to the line pressure $P_{line}$ in the body bore 66. Therefore, both increases and decreases in the line pressure $P_{line}$ will lead to the body cavity pressure $P_{cavity}$ remaining relatively close to the line pressure $P_{line}$ in the body bore 66.

As a further example, in the event that the fluid trapped within the body cavity 72 increases in volume (e.g., due to temperature variations), the resulting body cavity pressure $P_{cavity}$ may increase and the self-relieving effect of the body seat 24 may again cause the body seat 24 to push away from the ball 16, allowing the body cavity pressure $P_{cavity}$ to decrease to a pressure close to the line pressure $P_{line}$ in the body bore 66. More specifically, the fluid may release from the body cavity 72 into the body bore 66 between the ball 16 and the body seat 24.

An advantage of the disclosed embodiments is that the main body sections 32 of the seats 24 are not substantially deformed during assembly of the ball valve 10. More specifically, the only substantial deformation of the seats 24 during assembly of the ball valve 10 are to the lip sections 48 and lip legs 64, which are biased by the springs 38 in an axial direction, and the springs 38. As such, there is minimal deformation of the main body sections 32 of the seats 24 during assembly of the ball valve 10. In addition, the seats 24 primarily utilize the elastic properties of the springs 38 to energize the seals of the ball valve 10, instead of relying on the plastic material properties of the main body sections 32 of the seats 24. In general, the springs 38 may be more capable of retaining their elasticity over time than deformed plastics. As such, the seats 24 may experience longer life cycles than other seats, which are substantially pre-loaded through deformation as described above. Moreover, the deformation of the lip section 48 only insignificantly impacts the torque required to actuate the ball 16, thereby enhancing the effectiveness of the ball valve 10. Furthermore, since the compressive mechanical characteristics of the main body sections 32 of the seats 24 are less important in the disclosed embodiments, the materials used for the main body sections 32 of the seats 24 may be chosen from a larger variety of materials, enabling the seats 24 disclosed herein to be used in both low-pressure and high-pressure ball valves 10.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A ball valve capable of relieving cavity pressure, comprising:
   a body, comprising a first groove and a body passage;
   an adapter, comprising a second groove and an adapter passage, wherein the adapter is coupled to the body;
   a ball disposed between the body and the adapter and configured to rotate about a radial axis to allow or block a flow of fluid through the body passage and the adapter passage;
   a first unitary annular seat disposed within the first groove and in contact with and disposed between the body and the ball, wherein the first unitary annular seat comprises a first annular spring disposed between axially opposite first and second surfaces of the first unitary annular seat, the first surface comprises a first angled portion and a second angled portion, the first angled portion defines a first length and the second angled portion defines a second length, wherein the second length is greater than the first length and the second angled portion is configured to contact the ball, wherein the first and second angled portions are radially offset from each other and acutely angled relative to a central axis of the body passage, wherein the radial offset is configured to block contact between the first angled portion and the ball, and wherein the first annular spring biases the first and second surfaces of the first unitary annular seat axially away from one another along the central axis of the body passage and the adapter passage, and wherein the first unitary annular seat is configured to self-relieve; and
   a second unitary annular seat disposed within the second groove and in contact with and disposed between the ball and the adapter, wherein the second unitary annular seat comprises a second annular spring disposed between axially opposite third and fourth surfaces of the second unitary annular seat, the second annular spring biases the third and fourth surfaces of the second unitary annular seat axially away from one another along the central axis, and wherein the second unitary annular seat is configured to self-relieve.

2. The ball valve of claim 1, wherein the first unitary annular seat contacts the body to form a first seal at a first diameter, and the first unitary annular seat contacts the ball to form a second seal at a second diameter, wherein a difference between the first and second diameters develops a force which biases the first unitary annular seat against the body when a cavity pressure is higher than a body passage pressure, thereby relieving the cavity pressure.

3. The ball valve of claim 2, wherein the second unitary annular seat contacts the adapter to form a third seal at a third diameter, and the second unitary annular seat contacts the ball to form a fourth seal at a fourth diameter.

4. The ball valve of claim 1, wherein the first unitary annular seat comprises a first main body section, a first lip section extending from the first main body section, and a first seat groove between the first main body section and the first lip section, wherein the first annular spring is disposed within the first seat groove, and the second unitary annular seat comprises a second main body section, a second lip section extending from the second main body section, and a second seat groove between the second main body section and the second lip section, wherein the second annular spring is disposed within the second seat groove.

5. The ball valve of claim 4, wherein a first leg of the first annular spring biases the first lip section in a first axial direction along the central axis and a second leg of the first annular spring biases the first main body section in a second axial direction along the central axis opposite to the first axial direction, and a third leg of the second annular spring biases the second lip section in a third axial direction along the central axis and a fourth leg of the second annular spring biases the second main body section in a fourth axial direction along the central axis opposite to the third axial direction.

6. The ball valve of claim 4, wherein the first groove is rectangular, and the second groove is rectangular.

7. The ball valve of claim 6, wherein the first annular spring biases the first lip section against a first surface of the first groove, the first annular spring biases the first main body section away from the first surface of the first groove and against the ball, the second annular spring biases the second lip section against a second surface of the second groove, and the second annular spring biases the second main body section away from the second surface of the second groove and against the ball.

8. The ball valve of claim 1, wherein the first and second angled portions are radially separated by a connecting portion, wherein the connecting portion is perpendicular to the central axis.

9. The ball valve of claim 1, wherein the first and second annular springs are both u-shaped springs having opposite legs configured to bias along the central axis.

10. The ball valve of claim 9, wherein the first and second annular springs comprise metallic cantilever springs.

11. The ball valve of claim 1, wherein the first and second unitary annular seats are comprised of plastic or a combination of plastic and metallic materials.

12. A system, comprising:
    a valve housing comprising an annular groove with a rectangular cross-sectional shape;
    a ball disposed in the valve housing;
    a unitary annular ball valve seat disposed within the annular groove, the unitary annular ball valve seat comprises a main body section and a lip section, wherein the main body section defines opposite first and second axial surfaces and inner and outer circumferential surfaces, and wherein the lip section is recessed below the outer circumferential surface; and
    an annular spring disposed within a seat groove of the unitary annular ball valve seat, wherein the seat groove extends radially into the unitary annular ball valve seat at a position axially between the first and second axial surfaces of the unitary annular ball valve seat, and the annular spring biases the opposite first and second axial surfaces of the unitary annular ball valve seat axially into contact with the ball and the valve housing.

13. The system of claim 12, wherein the unitary annular ball valve seat comprises a main body section, the lip section extending from the main body section, and the seat groove between the main body section and the lip section, wherein the annular spring is disposed within the seat groove.

14. The system of claim 13, wherein a first leg of the annular spring biases the lip section in a first axial direction and a second leg of the annular spring biases the main body section in a second axial direction opposite the first axial direction.

15. The system of claim 12, wherein the unitary annular ball valve seat comprises an angled surface configured to interface with the ball.

16. The system of claim 15, wherein the angled surface comprises a first surface configured to make contact with the ball, a second surface configured to not make contact with the ball, and a tapered section connecting the first and second surfaces.

17. The system of claim 12, wherein the annular spring is a u-shaped spring.

18. The system of claim 17, wherein the annular spring comprises a metallic cantilever spring.

19. The system of claim 12, wherein the unitary annular ball valve seat is comprised of plastic or a combination of plastic and metallic materials.

20. The system of claim 13, wherein the lip section contacts the valve housing.

21. A unitary annular ball valve seat, comprising:
   a valve housing comprising an annular groove with a rectangular cross-sectional shape;
   a ball disposed in the valve housing;
   a unitary annular ball valve seat disposed within the annular groove, the unitary annular ball valve seat comprises a main body section and a lip section that extends from the main body section, the unitary annular ball valve seat forms a seat groove between the lip section and the main body section, wherein the main body section defines opposite first and second axial surfaces and inner and outer circumferential surfaces, wherein the first axial surface is configured to contact the valve housing and the second axial surface is configured to contact the ball, and wherein the lip section forms part of the first axial surface and comprises a protrusion between the opposite first and second axial surfaces; and
   an annular spring disposed within the seat groove of the unitary annular ball valve seat, wherein the seat groove extends radially into the unitary annular ball valve seat at a position axially between the first and second axial surfaces of the unitary annular ball valve seat, and the annular spring biases the opposite first and second axial surfaces of the unitary annular ball valve seat axially into contact with the ball and the valve housing;
   wherein the protrusion on the lip section retains the annular spring within the seat groove.

* * * * *